United States Patent
Parris

(10) Patent No.: US 11,353,062 B2
(45) Date of Patent: Jun. 7, 2022

(54) SHOCK ABSORBING RADIAL BEARING ASSEMBLY

(71) Applicant: Koyo Bearings North America LLC, Greenville, SC (US)

(72) Inventor: Ben Parris, Laurens, SC (US)

(73) Assignee: Koyo Bearings North America LLC, Greenville, SC (US)

(*) Notice: Subject to any disclaimer, the term of this patent is extended or adjusted under 35 U.S.C. 154(b) by 0 days.

(21) Appl. No.: 17/090,388

(22) Filed: Nov. 5, 2020

(65) Prior Publication Data

US 2021/0131495 A1    May 6, 2021

Related U.S. Application Data

(60) Provisional application No. 62/930,906, filed on Nov. 5, 2019.

(51) Int. Cl.
*F16C 33/58* (2006.01)
*F16C 27/06* (2006.01)
*F16C 19/18* (2006.01)

(52) U.S. Cl.
CPC .......... *F16C 33/583* (2013.01); *F16C 27/066* (2013.01); *F16C 19/183* (2013.01); *F16C 2326/24* (2013.01)

(58) Field of Classification Search
CPC ...... F16C 19/183; F16C 19/527; F16C 27/06; F16C 27/066; F16C 33/583; F16C 33/585; F16C 33/586; F16C 33/588; F16C 33/60; F16C 33/605; F16C 2326/24
See application file for complete search history.

(56) References Cited

U.S. PATENT DOCUMENTS

| | | | |
|---|---|---|---|
| 2,240,285 A * | 4/1941 | Chamberlin | B62D 1/16 384/536 |
| 2,414,335 A | 1/1947 | Schroeder | |
| 3,604,545 A * | 9/1971 | Bourgeois | F16C 27/066 192/98 |

(Continued)

FOREIGN PATENT DOCUMENTS

| | | |
|---|---|---|
| CH | 713898 A1 | 12/2018 |
| CN | 105485159 A | 4/2016 |

(Continued)

OTHER PUBLICATIONS

Machine Translation of DE-2518789-A (Year: 1975).*

(Continued)

*Primary Examiner* — Alan B Waits
(74) *Attorney, Agent, or Firm* — Nelson Mullins Riley & Scarborough LLP

(57) ABSTRACT

A shock absorbing radial bearing assembly for use with a shaft, having an inner ring including an inner race, an inner raceway, and a shock absorber element disposed therebetween, the inner ring being axially fixed relative to the shaft, an outer ring defining an outer raceway, and a plurality of roller elements disposed between the inner ring and the outer ring, each roller element being in rolling contact with the inner raceway and the outer raceway, wherein the inner ring is in direct contact with the shaft and has a circular cross-section as taken in a plane perpendicular to a longitudinal center axis of the shaft.

17 Claims, 5 Drawing Sheets

(56) References Cited

U.S. PATENT DOCUMENTS

| | | | |
|---|---|---|---|
| 3,876,266 A * | 4/1975 | Rozentals | F16C 25/083 |
| | | | 384/536 |
| 4,184,658 A | 1/1980 | Barahia | |
| 5,102,241 A * | 4/1992 | Pflungner | F16C 19/166 |
| | | | 384/499 |
| 6,007,252 A | 12/1999 | Thelen et al. | |
| 6,126,324 A | 10/2000 | Ponson et al. | |
| 6,536,953 B1 | 3/2003 | Cope et al. | |
| 6,802,648 B2 | 10/2004 | Merot et al. | |
| 2008/0210028 A1 | 9/2008 | Sato | |

FOREIGN PATENT DOCUMENTS

| | | | | |
|---|---|---|---|---|
| DE | 2518789 A * | 11/1975 | | |
| DE | 102006034729 B3 * | 1/2008 | | F16C 23/086 |
| DE | 102009031888 B4 | 9/2011 | | |
| DE | D E-102012217384 A1 * | 5/2014 | | F16H 9/16 |
| DE | 102005003987 B4 | 7/2018 | | |
| JP | 2006300200 A | 11/2006 | | |

OTHER PUBLICATIONS

Machine Translation of DE-102012217384-A1 (Year: 2014).*
Machine Translation of DE-102006034729-B3 (Year: 2008).*
Direct Industry, Ball Bearing, http://www.directindustry.com/prod/igus/product-4740-598191.html, 8 pages.
The New Ball Bearing Co, "Sealing Solutions," https://www.indiamart.com/the-newball-bearing-company/sealing-solutions.html, 6 pages.

* cited by examiner

SHOCK ABSORBING RADIAL BEARING ASSEMBLY

CLAIM OF PRIORITY

This application claims priority to U.S. provisional patent application No. 62/930,906 filed Nov. 5, 2019, the disclosure of which is incorporated by reference herein.

FIELD OF THE INVENTION

The present invention relates generally to support bearings. More particularly, the present invention relates to a radial support bearing assembly for use with a steering column assembly.

BACKGROUND

Bearing assemblies for supporting steering shafts within a steering column assembly are well known. For example, as shown in FIG. 1, the prior art steering column support bearing 1 includes an inner ring 2 defining an inner raceway, a pair of outer rings 6 defining an outer raceway, a retainer ring 8, a pair of preload rings 7 disposed between retainer ring 8 and outer rings 6, and a plurality of roller elements 5 disposed between the inner and outer raceways. When installed in a corresponding assembly, inner ring 2 is assembled on a corresponding shaft 9 and a press-fit, whereas retainer ring 8 is positioned within the surrounding component (not shown) in a press-fit as well. The described configuration may not be desirable for those applications in which impact/shock loads are encountered due to sensitivity to noise transmittance and vibration.

As such, a shock absorbing radial bearing assembly which is suited for use in electric vehicles (electric motor support, steering support bearing, drivetrain bearing, etc.) for the purpose of being able to handle the high speeds and instantaneous torque (both issues with the new electric vehicles) while at the same time damping out any noise, vibration, and harshness (NVH) concerns in the drivetrain is desirable. The damping of the sounds in the drivetrain will allow for a more pleasant consumer experience.

The present invention recognizes noise, vibration, and harshness concerns and addresses considerations of prior art constructions and methods.

SUMMARY OF THE INVENTION

In accordance with the present disclosure, one embodiment of a shock absorbing radial bearing assembly for use with a shaft, having an inner ring including an inner race, an inner raceway, and a shock absorber element disposed therebetween, the inner ring being axially fixed relative to the shaft, an outer ring defining an outer raceway, and a plurality of roller elements disposed between the inner ring and the outer ring, each roller element being in rolling contact with the inner raceway and the outer raceway, wherein the inner ring is in direct contact with the shaft and has a circular cross-section as taken in a plane perpendicular to a longitudinal center axis of the shaft.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
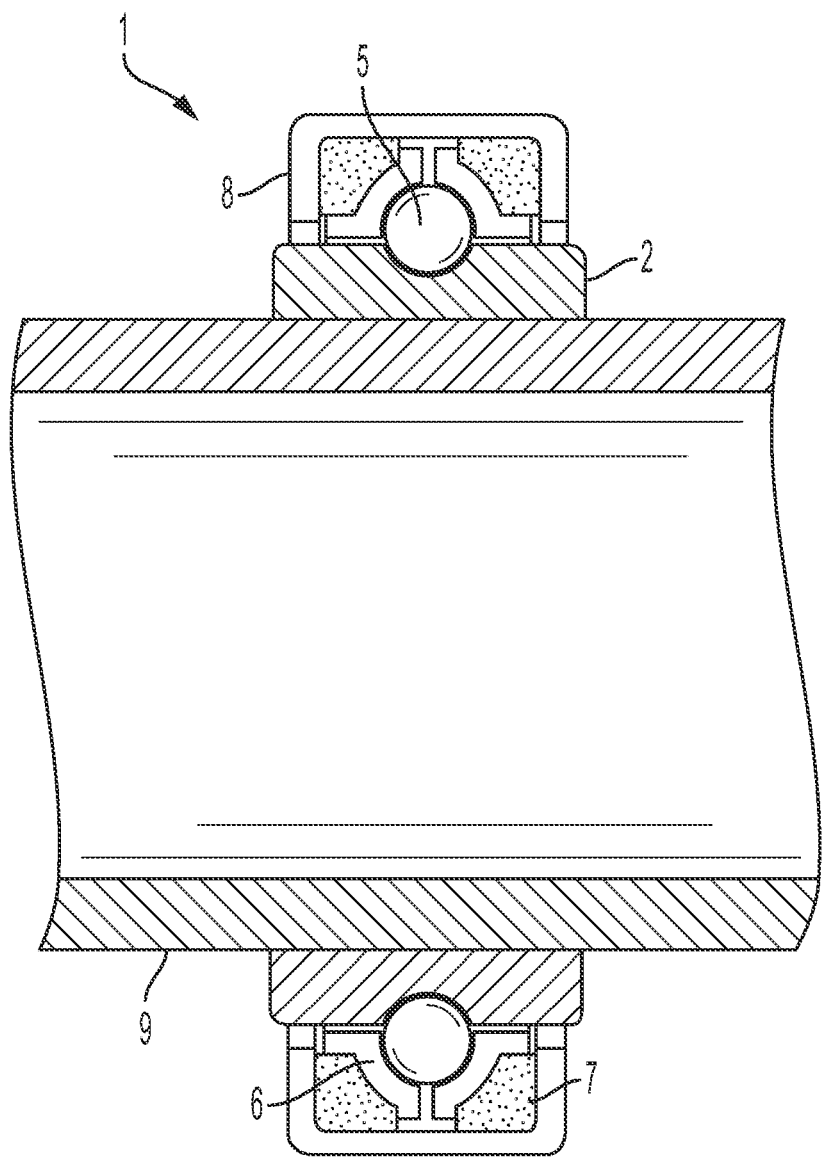
FIG. 1 is a cross-sectional view of a prior art support bearing installed on a steering column.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
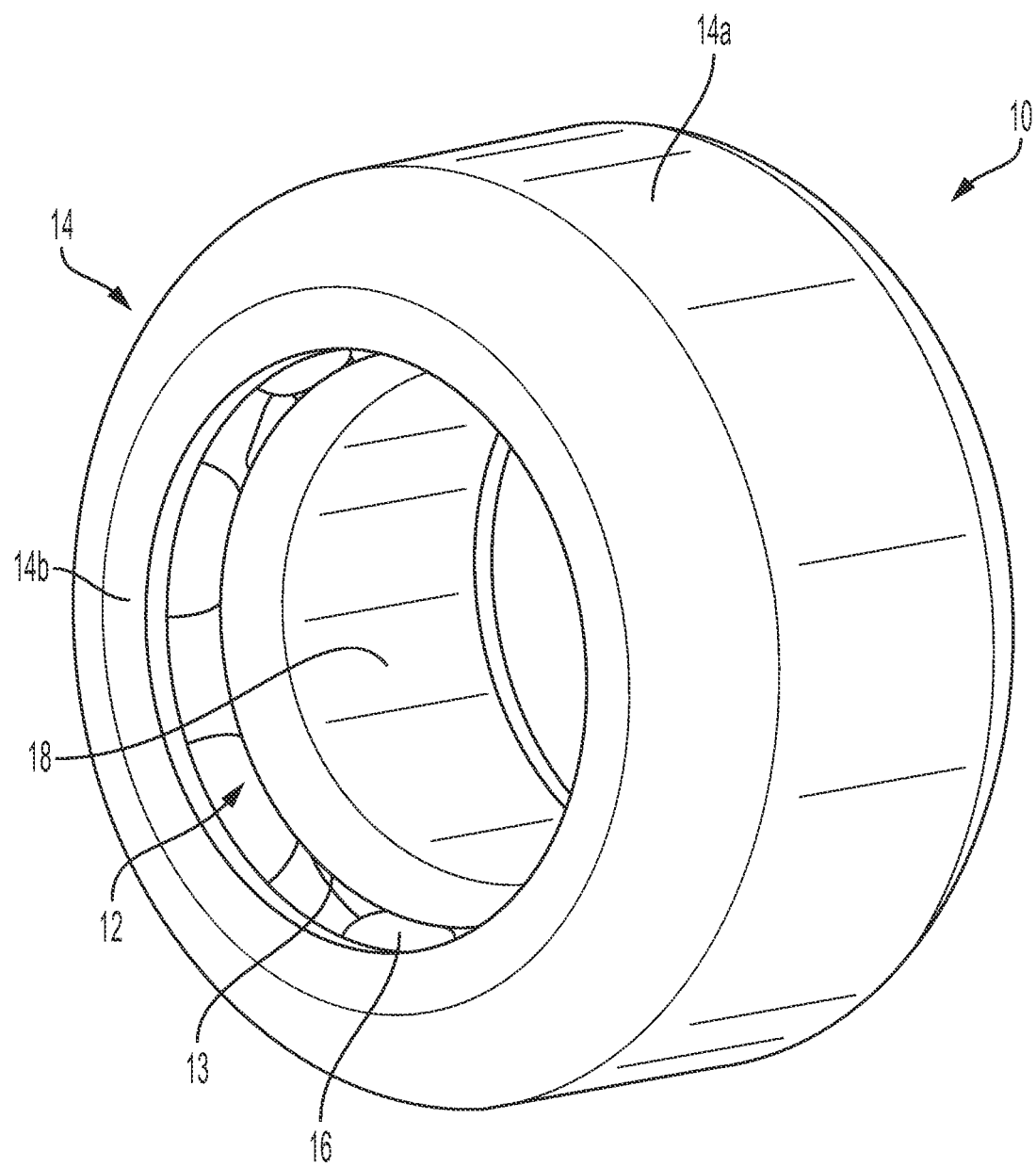
FIG. 2 is a perspective view of a shock absorbing radial bearing assembly in accordance with the present disclosure.
Figure 3:
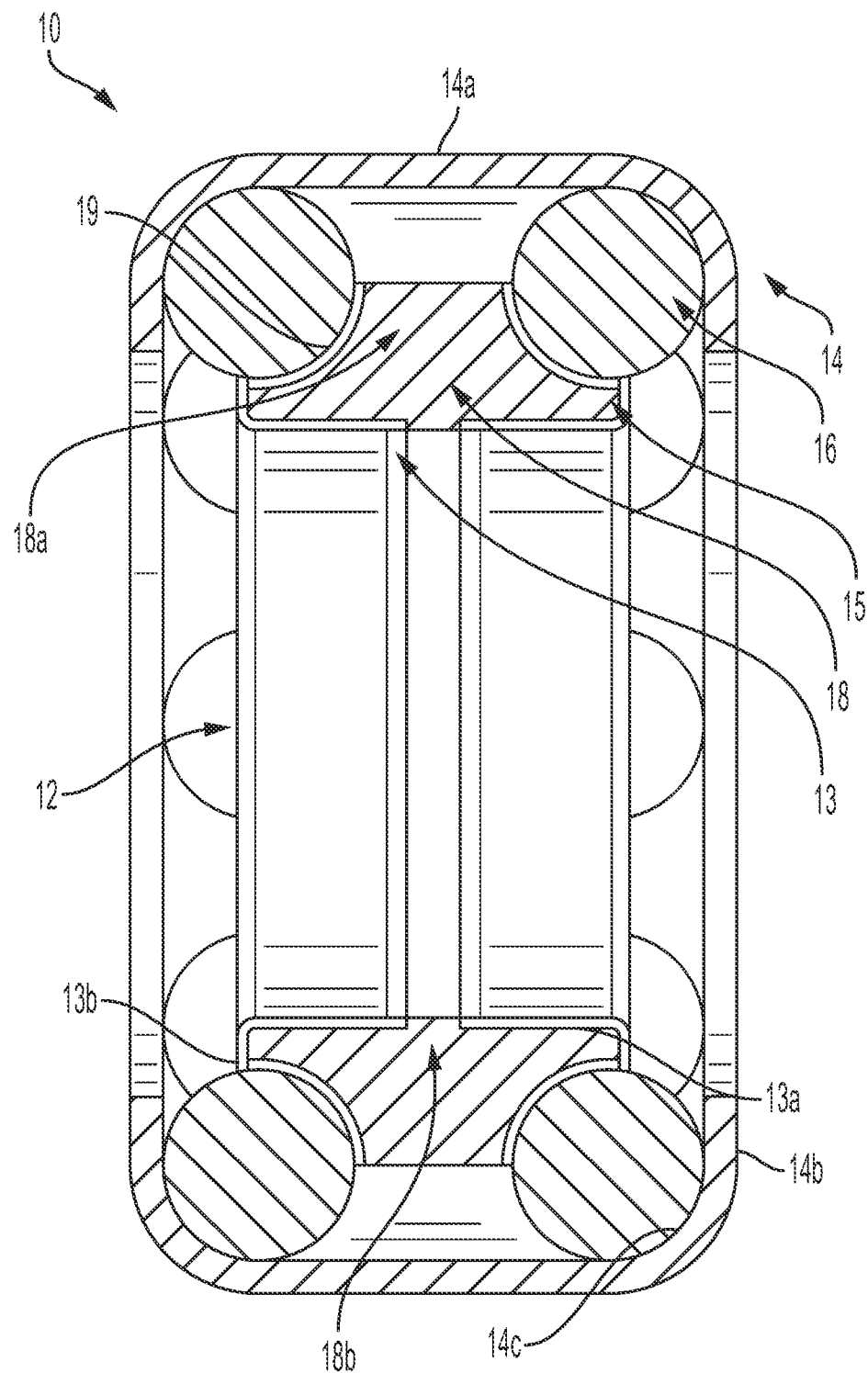
FIG. 3 is a cross-sectional view of the radial bearing assembly shown in FIG. 2.

Referring now to the figures, as shown in FIGS. 2 and 3, an embodiment of a shock absorbing radial bearing assembly 10 in accordance with the present disclosure includes an inner ring 12, a formed outer ring 14, two complements of ball bearings 16 (caged or uncaged), and a polymer (or elastomer) damper/shock absorber portion 18 that is formed for use on the interior of the bearing. The shock absorber 18 in the interior of the bearing helps reduce system vibrations and shift frequencies in the system. The ability of this design to isolate the application from vibrations in the system is very desirable due to the growing attention that is being put toward NVH in vehicles. The shock absorber section 18 of this bearing is a polymer or elastomer material which allows the bearing to handle impact loads without brinelling the raceways while at the same time absorbing vibrations in the system to make the user experience much more pleasant.

As best seen in FIG. 3, outer ring 14 includes a cylindrically-shaped body portion 14a, and a pair of annular flanges 14b, on each extending radially-inwardly from opposing ends of the body portion 14a. A semi-circular wall portion 14c is formed at the intersection of each annular flange 14b and body portion 14a. Each wall portion 14a of outer ring 14 serves as an outer raceway for a corresponding set of ball bearings 16.

Figure 5:
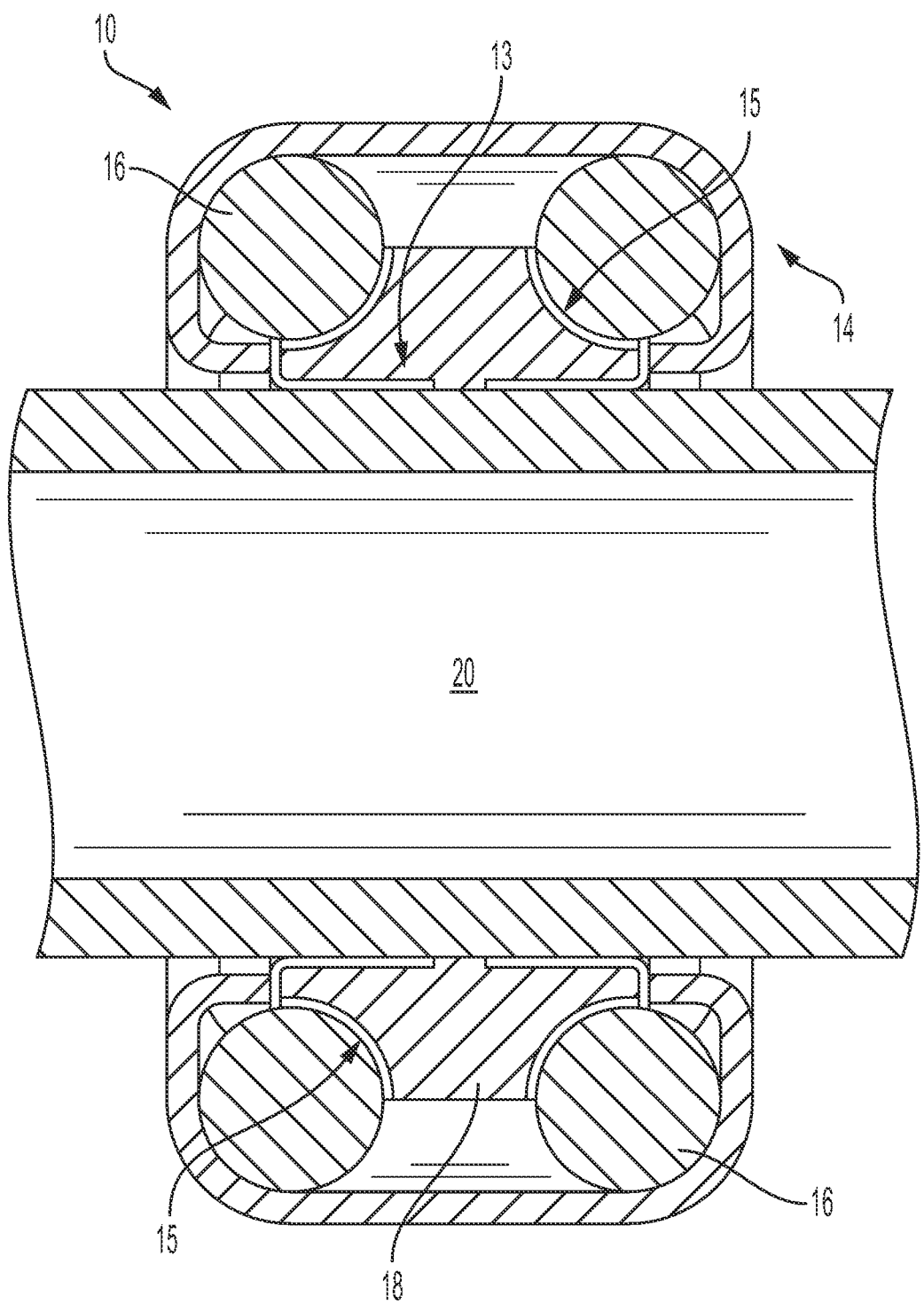
FIG. 5 is a partial cross-sectional view of the radial bearing assembly shown in FIG. 3 installed on a steering column.

Still referring to FIG. 3, the inner ring 12 includes a pair of inner races 13 and a pair of inner raceways 15, with the shock absorber 18 disposed therebetween. As shown, each inner raceway 15 has a semi-circular cross-section and is mounted to a correspondingly shaped recess 19 formed on one of the axially opposing ends of the shock absorber portion 18. As such, an outer portion 18a of shock absorber portion 18 is disposed between the inner raceways 15. Preferably, each inner race 13 includes a cylindrically-shaped first portion 13a that abuts an outer surface of a corresponding steering column 20 (FIG. 5) and a second portion 13b in the form of an annular flange extending radially-outwardly from an outermost perimeter of the corresponding first portion 13a. Similarly to the inner raceways 15, an inner portion 18b of the shock absorber portion 18 is disposed between the inner races 13. As such, when loads act on radial bearing assembly 10, both the inner races 13 and inner raceways 15 are able to respond independently of one another. For example, under a radially-compressive load, the inner races 15 can move independently of each other, whereas the inner raceways 13 can move in opposite axial directions relative to the steering column 20. Each set of ball bearings 16 is received between a corresponding inner raceway 15 and the outer ring 14.

Figure 4:
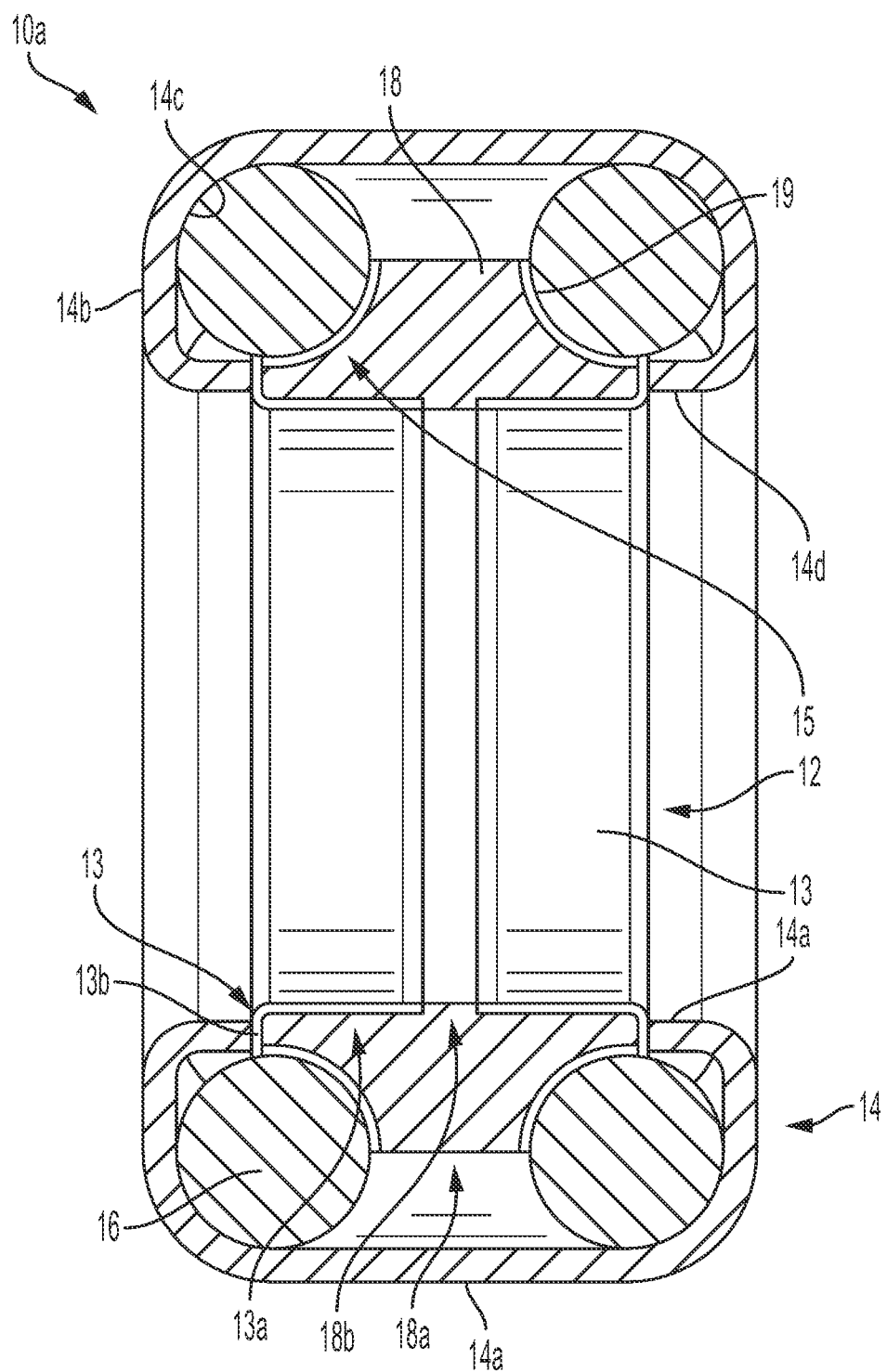
FIG. 4 is a cross-sectional view of an alternate embodiment of a radial bearing assembly in accordance with the present disclosure.

Referring now to FIG. 4, a second embodiment of a shock absorbing radial bearing assembly 10a in accordance with the present disclosure is shown. The second embodiment is substantially similar to the first embodiment, with similar elements having the same reference numbers. The second embodiment differs from the previously discussed first embodiment primarily in that it includes an extra feature which re-routes impact energy if an impact on the bearing assembly 10a is unusually high. Specifically, the outer ring 14 includes a pair of axially-inwardly depending flanges 14d that form small annular gaps 22 between the inner end face of each flange 14d and the flange 13b of the corresponding inner race 13. When the shock/impact reaches a predetermined amount, the shock absorber portion 18 compresses, thereby moving the inner races 13 axially-outwardly where each makes contact with the flange 14d of the outer ring 14. The re-routing of energy to the outer ring 14 protects the bearing's raceways from brinelling, while at the same time not damaging the system around it. Note, dependent upon the direction and amount of the load applied to the bearing assembly 10a, neither, one, or both inner races 13 may make contact with the flanges 14d of the outer ring 14. Just as with the first embodiment, the shock absorber portion 18 of the inner ring 12 reduces unwanted vibrations and modal frequency changes.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A shock absorbing radial bearing assembly for use with a shaft, comprising:
an inner ring including a first inner race and a second inner race, an inner raceway, and a shock absorber element disposed therebetween;
an outer ring defining an outer raceway; and
a plurality of roller elements disposed between the inner ring and the outer ring, each roller element being in rolling contact with the inner raceway and the outer raceway,
wherein the inner ring is in direct contact with the shaft, has a circular cross-section as taken in a plane perpendicular to a longitudinal center axis of the shaft, and the first race and the second race are separated by a gap, and wherein each of the first inner race and the second inner race includes a cylindrical portion and an annular flange that extends radially-outwardly from an outermost perimeter of the cylindrical portion.

2. The radial bearing assembly of claim 1, wherein:
the inner raceway comprises a first inner raceway and a second inner raceway; and
the plurality of roller elements comprises a first and a second plurality of roller elements,
the first plurality of roller elements being disposed between the first inner raceway portion and the outer raceway, and the second plurality of roller elements being disposed between the second inner raceway portion and the outer raceway.

3. The radial bearing assembly of claim 2, wherein an inner portion of the shock absorber is disposed in the gap between the first inner race and the second inner race.

4. The radial bearing assembly of claim 3, wherein an outer portion of the shock absorber is disposed between the first inner raceway and the second inner raceway.

5. The radial bearing assembly of claim 1, wherein the shock absorber is disposed between the annular flange portions of the first inner race and the second inner race.

6. The radial bearing assembly of claim 1, wherein the outer ring further comprises a cylindrical body portion and a pair of annular flanges, each annular flange extending radially-inwardly from an opposing edge of the body portion.

7. The radial bearing assembly of claim 6, wherein the outer ring further comprises a semi-circular wall portion disposed at an intersection of each annular flange and the cylindrical body portion.

8. The radial bearing assembly of claim 6, further comprising a pair of axially-inwardly depending flanges, each axially-inwardly depending flange extending from an innermost perimeter of a corresponding radially-inwardly depending annular flange of the outer ring so that a gap is defined between an innermost edge of each axially-inwardly depending flange and the radially-outwardly depending flange of a corresponding one of the first inner race and the second inner race.

9. A shock absorbing radial bearing assembly for use with a shaft, comprising:
an inner ring including a first inner race and a second inner race, an inner raceway, and a shock absorber element disposed therebetween;
an outer ring defining an outer raceway; and
a plurality of roller elements disposed between the inner ring and the outer ring, each roller element being in rolling contact with the inner raceway and the outer raceway,
wherein the first inner race and the second inner race are in direct contact with the shaft, and the first race and the second race are separated by a gap.

10. The radial bearing assembly of claim 9, wherein:
the inner raceway comprises a first inner raceway and a second inner raceway; and
the plurality of roller elements comprises a first and a second plurality of roller elements,
the first plurality of roller elements being disposed between the first inner raceway portion and the outer raceway, and the second plurality of roller elements being disposed between the second inner raceway portion and the outer raceway.

11. The radial bearing assembly of claim 10, wherein an inner portion of the shock absorber is disposed in the gap between the first inner race and the second inner race.

12. The radial bearing assembly of claim 11, wherein an outer portion of the shock absorber is disposed between the first inner raceway and the second inner raceway.

13. The radial bearing assembly of claim 9, wherein each of the first inner race and the second inner race includes a cylindrical portion and an annular flange that extends radially-outwardly from an outermost perimeter of the cylindrical portion.

14. The radial bearing assembly of claim 13, wherein the shock absorber is disposed between the annular flange portions of the first inner race and the second inner race.

15. The radial bearing assembly of claim 13, wherein the outer ring further comprises a cylindrical body portion and a pair of annular flanges, each annular flange extending radially-inwardly from an opposing edge of the body portion.

16. The radial bearing assembly of claim 15, wherein the outer ring further comprises a semi-circular wall portion disposed at an intersection of each annular flange and the cylindrical body portion.

17. The radial bearing assembly of claim 15, further comprising a pair of axially-inwardly depending flanges, each axially-inwardly depending flange extending from an innermost perimeter of a corresponding radially-inwardly depending annular flange of the outer ring so that a gap is defined between an innermost edge of each axially-inwardly depending flange and the radially-outwardly depending flange of a corresponding one of the first inner race and the second inner race.

* * * * *

UNITED STATES PATENT AND TRADEMARK OFFICE
CERTIFICATE OF CORRECTION

Page 1 of 1

PATENT NO. : 11,353,062 B2
APPLICATION NO. : 17/090388
DATED : June 7, 2022
INVENTOR(S) : Ben Parris It is certified that error appears in the above-identified patent and that said Letters Patent is hereby corrected as shown below:

On the Title Page

On Page 2, under the heading "FOREIGN PATENT DOCUMENTS", delete "D E-102012217384" and insert --102012217384--.

In the Specification

In Column 2, Line 8, after the word "in", insert --FIG. 2--.

In Column 2, Line 9, delete "FIG. 2;".

In Column 3, Line 13, delete "inner races 15" and insert --inner races 13--.

In Column 3, Line 14, delete "inner raceways 13" and insert --inner raceways 15--.

Signed and Sealed this
Twenty-seventh Day of September, 2022

Katherine Kelly Vidal
*Director of the United States Patent and Trademark Office*